(12) United States Patent
Hufenbach et al.

(10) Patent No.: US 9,475,341 B2
(45) Date of Patent: Oct. 25, 2016

(54) WHEEL RIM HAVING A WHEEL DISK MADE FROM FIBER COMPOSITE MATERIAL AND HAVING A FASTENER

(71) Applicant: THYSSENKRUPP CARBON COMPONENTS GMBH, Wilsdruff STT Kesselsdorf (DE)

(72) Inventors: Werner Hufenbach, Dresden (DE); Martin Lepper, Dresden (DE); Jens Werner, Coswig (DE); Christian Koehler, Dresden (DE)

(73) Assignee: THYSSENKRUPP CARBON COMPONENTS GMBH, Wilsdruff Stt Kesselsdorf (DE)

( * ) Notice: Subject to any disclaimer, the term of this patent is extended or adjusted under 35 U.S.C. 154(b) by 15 days.

(21) Appl. No.: 14/427,058

(22) PCT Filed: Dec. 3, 2012

(86) PCT No.: PCT/DE2012/100367
§ 371 (c)(1),
(2) Date: Mar. 10, 2015

(87) PCT Pub. No.: WO2014/044237
PCT Pub. Date: Mar. 27, 2014

(65) Prior Publication Data
US 2015/0224818 A1   Aug. 13, 2015

(30) Foreign Application Priority Data
Sep. 24, 2012   (EP) ..................................... 12006678

(51) Int. Cl.
*B60B 3/00*   (2006.01)
*B60B 3/14*   (2006.01)
(Continued)

(52) U.S. Cl.
CPC ................. *B60B 3/004* (2013.01); *B60B 3/02* (2013.01); *B60B 3/12* (2013.01); *B60B 3/142* (2013.01); *B60B 3/147* (2013.01); *B60B 5/02* (2013.01);
(Continued)

(58) Field of Classification Search
CPC ........... B60B 3/004; B60B 3/12; B60B 3/02; B60B 3/142; B60B 3/147; B60B 5/02
See application file for complete search history.

(56) References Cited

U.S. PATENT DOCUMENTS 1,479,482 A * 1/1924 Prescott .................... B60B 3/04
                                                          301/11.1
4,072,358 A * 2/1978 Ridha ....................... B60B 5/02
                                                          301/64.703
(Continued)

FOREIGN PATENT DOCUMENTS

DE           1939910 A      2/1971
DE         68922982 T2     10/1995
(Continued)

*Primary Examiner* — Kip T Kotter
(74) *Attorney, Agent, or Firm* — Abel Law Group, LLP

(57) ABSTRACT

The invention relates to a wheel rim having a wheel disk (3) made of a fiber composite and having fastener for fastening the wheel disk (3) to a wheel hub (5) of a vehicle, wherein the wheel disk (3) has at least one opening (8) for receiving the wheel hub (5) and the opening (8) is designed to have a conical centring surface (9) for the corresponding seat of a fastener. According to the invention the reinforcing fibers of the fiber composite are arranged in planar layers (10) and at least a part of the fiber layers (10) is arranged in an edge region (12) of the opening (8) perpendicular to the centring surface (9) of the wheel disk (3).

15 Claims, 3 Drawing Sheets

(51) Int. Cl.
*B60B 5/02* (2006.01)
*B60B 3/12* (2006.01)
*B60B 3/02* (2006.01)

(52) U.S. Cl.
CPC ............ *B60B 3/14* (2013.01); *B60B 2310/204* (2013.01); *B60B 2360/342* (2013.01); *B60B 2360/3412* (2013.01); *B60B 2360/3414* (2013.01); *B60B 2360/3416* (2013.01); *B60B 2900/113* (2013.01); *B60B 2900/321* (2013.01)

(56) References Cited

U.S. PATENT DOCUMENTS

| | | | | |
|---|---|---|---|---|
| 4,294,639 A | * | 10/1981 | Woelfel | B29C 53/60 156/185 |
| 4,413,860 A | * | 11/1983 | Prescott | B29C 70/08 301/64.703 |
| 4,636,344 A | * | 1/1987 | McDougall | B60B 5/02 264/102 |
| 4,721,342 A | * | 1/1988 | Daniels | B29C 70/081 301/64.703 |
| 5,022,712 A | | 6/1991 | Woelfel et al. | |
| 5,123,711 A | | 6/1992 | Woelfel et al. | |
| 5,277,479 A | * | 1/1994 | Koyama | B60B 5/02 301/6.91 |
| 5,636,905 A | * | 6/1997 | Pagacz | B60B 3/142 301/35.58 |
| 6,416,135 B1 | * | 7/2002 | Greubel | B60B 3/02 301/35.625 |
| 2012/0212037 A1 | | 8/2012 | Bohrmann et al. | |

FOREIGN PATENT DOCUMENTS

| | | |
|---|---|---|
| DE | 19608601 A1 | 9/1997 |
| DE | 19940524 A1 | 4/2001 |
| DE | 10145630 A1 | 4/2003 |

\* cited by examiner

WHEEL RIM HAVING A WHEEL DISK MADE FROM FIBER COMPOSITE MATERIAL AND HAVING A FASTENER

BACKGROUND OF THE INVENTION

1. Field of the Invention

The invention relates to a wheel rim with a wheel disk made from a fiber composite material and with fasteners to fasten the wheel disk to a wheel hub of a vehicle, wherein the wheel disk has at least one opening to accommodate the wheel hub and the opening is formed with a conical centring surface for the seat of a fastener.

2. Discussion of Background Information

Wheel disks made from a fiber composite material are known for example from published document DE 1939910 A. The published document discloses a method for manufacturing wheels from fiber-reinforced plastics for motor vehicles in which, in an area of high tensions of the wheel disk or wheelbrace, reinforcing fibers are arranged in accordance with the direction of flow of the arising tensions, in a circle and radial to the axle. To increase the strength, additional fiber inserts are arranged on top of one another in this area. Neither the opening for the wheel hub, nor the seat of the wheel hub, nor a fastener, are described in any more detail. From the figures, a convex border area of the opening is visible, with the wheel disk terminating with a border surface that leads in the direction of the axle. In accordance with this, it is to be expected that the fiber layers located in the border area of the opening, that is to say in the area of the highest tensions, are, as a result of the loads introduced there, primarily under bending-related stress, which involves a considerable weakening of the fiber composite structure in this area and can form a starting point for delamination of the fiber layers.

From published document DE 101 45 630 A1 a wheel disk or wheel spider made from fiber composite material is known, wherein the fibers in the wheel spider are largely arranged in a radial direction. In addition, the wheel spider may contain webbing or fabric made from endless fiber strands oriented in a radial or circumferential direction. In the center of the wheel spider, the wheel spider may be firmly attached to an integrated wheel hub. The design of the opening for accommodating the wheel hub is not described in any more detail. From the drawing, a flat border area of the opening is visible, with the wheel disk terminating with a border surface that leads in a direction perpendicular to the axle, which serves as a seat for the cylindrical stub of the wheel hub. A bearing surface of the wheel hub indicates that the connection with the wheel disk is performed by means of a fastener through bracing against the flat border area of the opening of the wheel disk. Through the preload forces generated in this way, the fibers of the webbing or fabric of the wheel disk are pressed together, as a result of which the fiber composite structure is weakened considerably in this area.

From published document DE 689 22 982 T2 a vehicle wheel made from fiber-reinforced composite material is known which comprises a wheel rim with a wheel disk. For fastening the wheel disk to a wheel hub, the wheel disk has a central fastening opening to accommodate the wheel hub and a number of fastening openings arranged concentrically around the axle, which accommodate the connection elements, equipped with screw threads, to fasten the wheel disk to the wheel hub. The stud bolts are screwed on in an axial direction. To ensure an exact fit of the connection elements (stud bolts), each fastening opening is provided with a conical seat surface in the manner of a chamfer that has been cut in. The reinforcing fibers of the wheel disk are preferably arranged in planes perpendicular to the axle and end in the fastening openings i.e. the course of the fibers is interrupted here.

Disadvantageous is that through the design of the fastening openings, the wall cross-section of the wheel disk is tapered and hence the fiber composite structure of the wheel disk is weakened in the very area—the connection to the wheel hub of the vehicle—placed under high stress.

Furthermore, during the introduction of the preload forces into the wheel disk, the fiber layers are pressed together, as a result of which the fiber composite structure is likewise weakened.

A device of the generic kind is known from published document DE 196 08 601 A1. Here, a wheel rim with a wheel disk made from fiber-reinforced plastic is described in which the wheel disk has a central opening and is connected by means of a central fastening to the wheel hub or a fastening element of the wheel hub of the wheel hub. The fastening element is connected to the axle by means of several stud bolts. The central opening of the wheel disk has a conical centring surface in the direction of the fastening element to center the wheel disk on the fastening element. The central opening also has a conical centring surface in the direction of the central nut, in order to ensure the centric seat of the central nut and the clamping ring in between.

Although the conical centring surfaces provide an enlarged area for the introduction of the clamping forces, the design also results in the wall thickness of the wheel disk being reduced in the very area that is subject to high stresses and hence the strength of the fiber composite material being weakened.

Furthermore, this fastening solution requires a high level of effort in terms of production and assembly.

The problem underlying the invention is to provide a wheel rim which overcomes the aforementioned disadvantages of the prior art; in particular, the problem consists of improving the durability of the wheel connection and at the same time minimizing the production and assembly effort required.

SUMMARY OF THE INVENTION

The problem is solved in accordance with the invention by the reinforcing fibers of the fiber composite material being arranged in two-dimensional fiber layers and by at least part of the fiber layers being arranged in a border area of the opening of the wheel disk perpendicular to the centring surface of the wheel disk.

The invention makes use of the properties of endless-fiber-reinforced fiber composite structures which have fiber layers arranged in several planes or tiers. The fiber layers are essentially two-dimensional, textile webbing or fabric consisting of fiber strands made from endless fibers (rovings). The fiber strands contain reinforcing fibers such as e.g. carbon fibers, glass fibers or aramid fibers. In accordance with the invention, some or all fiber layers are arranged in the border area of the opening perpendicular to the centring surface; consequently the planes in which the reinforcing fibers run also lie in the border area of the opening, perpendicular to this centring surface. Since the conical centring surface is always inclined to the axle at an angle deviating from a right angle, the fiber layers or the planes of reinforcing fibers are thus also not arranged perpendicular to the axle in the border area of the opening. In the border area of the opening, the reinforcing fibers run not at right angles to the axle and end bluntly in the centric surface.

The border area of the opening is the area of the wheel disk that is subject to particularly high stresses through the direct and indirect contact with the fastener.

The invention assumes that the mechanical resilience of the endless-fiber-reinforced fiber composite material is significantly lower in the direction of a notional surface normal of the fiber layer and hence transverse to the fiber direction of the reinforcing fibers than perpendicular to this surface normal. The preload force of the fasteners acting in an axial direction in the border area during the wheel mounting is introduced via the centring surface into the wheel disk, and indeed plane parallel into the planes of the reinforcing fiber layers and preferably in the fiber direction of the reinforcing fibers.

Here the force flow path runs from the fastener via the centring surface in the direction of the reinforcing fibers and directly into the reinforcing fibers. Thus a 'fiber-friendly' introduction of force into the fiber composite structure is enabled which provides for a pressing of the fiber composite material in what is actually the preferential direction in terms of load-bearing capacity. As a result, significantly greater durability of the wheel connection is achieved with few constructional means.

The solution according to the invention can be used both for a wheel connection using a central fastening, and for a wheel connection using a traditional bolt circle connection.

Advantageous embodiments and developments of the invention are apparent from the dependent patent claims, the subsequent description and the associated drawings.

In a preferred embodiment, the conical centring surface extends fully across the wall cross-section of the wheel disk. In this way, the force can be introduced from the fastener across the whole wall thickness and into all the reinforcing fibers ending at the opening. This brings about a particularly favourable distribution of forces.

Preferably, the fiber layers of the fiber composite material are essentially arranged in parallel to the disk contour of the wheel disk.

In this way the force introduced into the fiber layers through the bracing of the fasteners can be continuously diverted into the radially extending, peripheral area of the wheel disk, thereby avoiding peaks in forces.

In an advantageous embodiment, at least one fastener has a seat surface which is constructed to be congruent to the centring surface of the wheel disk. As a result of the seat surface that contacts with the centring surface completely covering the centring surface, the preload forces can be distributed evenly across the entire centring surface and hence the stress placed on the individual fiber planes of the fiber composite structure be reduced.

If the border area of the opening has a metallic insert, the wheel disk is additionally reinforced in the highly stressed area around the opening. Mechanical stress and signs of wear on the fiber composite structure of the wheel disk, as for example occur with repeated wheel mounting and through the tightening of fasteners, can thus be reduced.

Likewise, by means of the insert, the vibration-related rubbing wear that results from the relative movement while driving is reduced.

Preferably, the insert is arranged in such a way that it encloses the border area of the opening of the wheel disk. Thus the outer surfaces of the border area of the opening, and in particular also the centring surface, are protected from assembly-related stress and from wear and tear. The insert also facilitates the centring of the wheel rim on the wheel hub. The metallic encasing by means of the insert brings about a favourable distribution of the preload force on the border area and the centring surface.

For the manufacture of the wheel disk, it is particularly advantageous if the insert is designed as two parts. The division enables subsequent installation of the insert following the wheel disk consolidation process.

In a preferred embodiment the wheel disk has, on the vehicle side, a bearing surface for contacting with a support surface of the wheel hub or a fastener connected to the wheel hub, wherein the support surface is designed so as to correspond to the bearing surface in a form-fit manner. The support surface of the wheel hub, or of the fastener on the wheel hub side, constitutes the counterforce element during fastening of the wheel disk to the wheel hub. The bearing surface may have any contour, preferably one that is constructed so as to be parallel to the fiber layers. In this case, the contour of the bearing surface is bent in the border area of the opening of the wheel rim, or at least designed not at right angles to the axle. Thanks to a design of the support surface which is form-fit to the bearing surface it is possible, during assembly, for the preload force on the wheel hub side to be introduced over the maximum surface area into the wheel disk, which reduces the stress placed on the fiber composite structure in this area.

Introducing the axial preload force on the vehicle side via the support surface brings about a certain pressing of the fiber layers of the fiber composite material of the wheel disk transverse to the direction of the fibers. However, owing to the tailored size and shape of the support surface, this pressing takes place with particularly large load distribution and a low area load.

It is particularly favourable when the bearing surface on the vehicle side is arranged in the border area of the opening of the wheel disk, where the corresponding support surface supports, at this point, the fiber layers in their redirection from what is essentially a radial alignment to the alignment that is bent in relation to the axle.

In a further embodiment of the invention, the wheel disk has a bearing surface on the outside and a fastener has a support surface that corresponds in a form-fit manner with the outside bearing surface. Hence the wheel disk is additionally enclosed on the side by a fastener. As a result, an isostatic state of stress is generated in this area, which prevents distortion of the fiber composite structure of the wheel disk and thereby increases the local stability of the wheel disk.

Preferably, the outside bearing surface is arranged in the border area of the opening, where the fact that it is additionally passed through the corresponding support surface of the fastener strengthens, in particular, the highly loaded area of the connection of the wheel disk to the wheel.

Advantageously, the insert provided in the border area of the opening is arranged so as to extend across the bearing surface(s). The insert can be arranged so that it extends across one bearing surface or several bearing surfaces of the wheel disk, namely across the bearing surface on the vehicle side or the bearing surface on the outside or across both of the named bearing surfaces. Thus signs of wear and tear from contact between the surface of the wheel disk and the support surface of the wheel hub or of the fastener on the wheel hub side, or with the support surface of an outside fastener acting in the opposite direction, can be effectively reduced and the introduction of force into the wheel disk improved.

In a particularly advantageous embodiment, a second border area with a second conical centring area is formed at the opening, wherein part of the fiber layers of the fiber composite material of the wheel disk is arranged in the second border area of the opening and perpendicular to the second centring surface. The fiber layers are divided across the two border areas of the opening and end perpendicular to the particular centring surfaces. By this means, the 'fiber-friendly' introduction of the preload force of the wheel screw connection can occur in such a way as to distribute load into all fiber layers. The second centring surface of the splayed border area can be contacted with a conical seat surface of the wheel hub or a conical seat surface of a fastener with forces acting in the opposite direction, as a result of which a pressing of the fiber layers of the wheel disk transverse to the fiber direction can be completely avoided. Because a higher contact pressure is possible on the centring surface as a consequence of the better resilience of the fiber layers, the conical seat surface can be designed considerably smaller than the support surface required for pressing on the outer bearing surface of the wheel disk.

Furthermore, with this form of connection of the wheel disk, changes in stiffness in the wheel disk are avoided; these can occur during the pressing of the fastener to a bearing surface parallel to the wheel disk, particularly in the transition from the bearing surface to the outer peripheral area of the wheel disk.

If a support element is arranged in an interspace formed between the border areas, the wheel disk is strengthened particularly at this point. The support element stabilizes the highly stressed area of the wheel disk against the static and dynamic loads prevailing on the wheel connection. Preferably the support element is a ring-shaped element, profiled all the way around and made from a solid material, which completely fills the interspace. Thereby an isostatic state of stress is generated in this area, as a result of which very high loads can be transferred.

In a particularly advantageous embodiment of the invention, the fastener is designed as an adapter disk which has a seat surface for the seat on the centring surface of the centric opening of the wheel disk and several concentrically arranged openings to accommodate fastening bolts. This embodiment makes it possible to fasten a wheel disk according to the invention, which is equipped with a centric opening, to a wheel hub with a bolt circle by means of a bolt circle connection.

If the adapter disk is designed in such a way that it can be arranged on a centring collar of the wheel hub or of a fastener connected to the wheel hub, this facilitates the tailored-to-fit arrangement and mounting of the wheel rim on the wheel hub using the fasteners.

BRIEF DESCRIPTION OF THE DRAWINGS

The device according to the invention will be explained in more detail with the aid of several embodiments. The following are shown as a schematic representation.

DETAILED DESCRIPTION OF THE INVENTION

Figure 1:
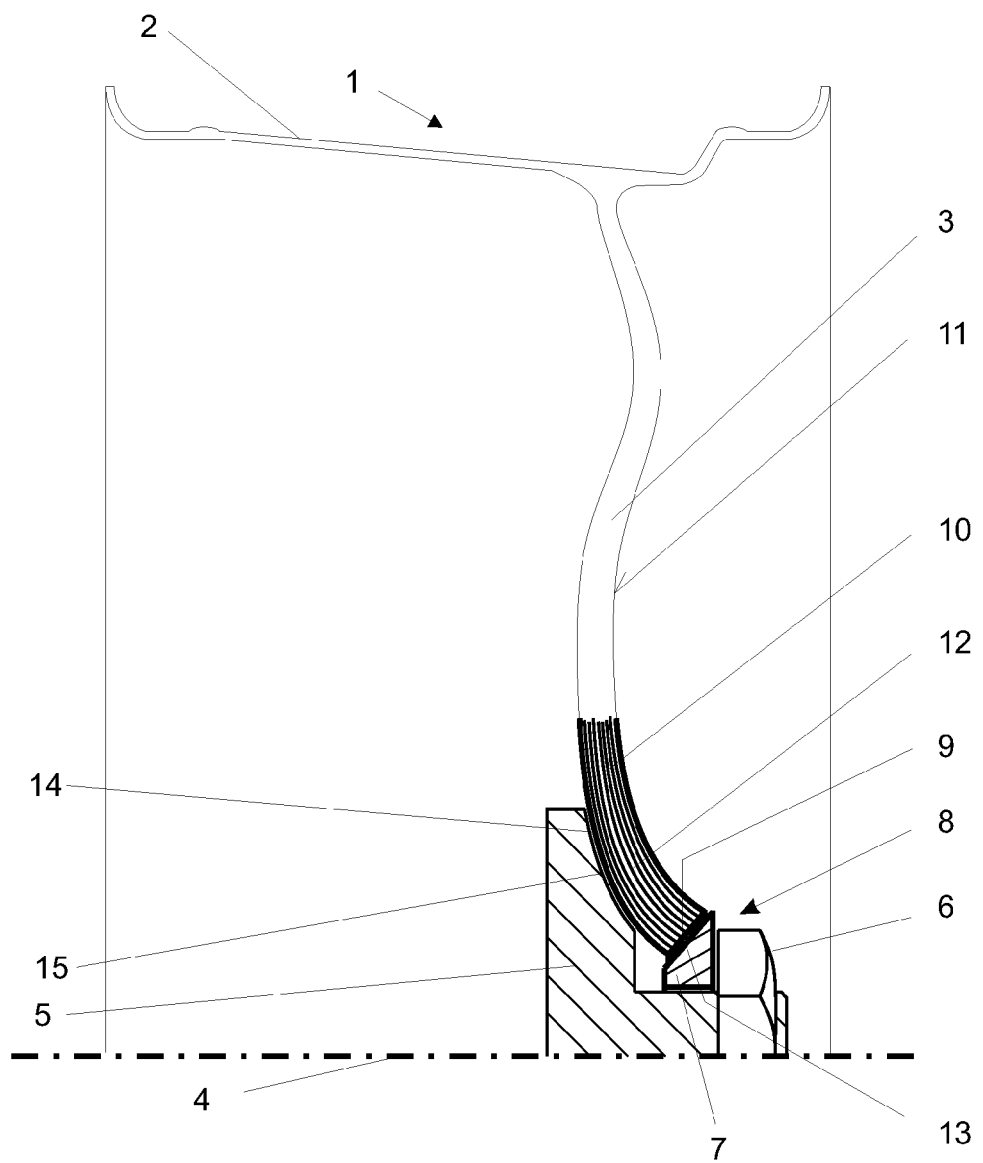
FIG. 1 a fragmentary sectional view of a wheel rim fastened to a wheel hub by means of a central fastening FIG. 2 a detailed sectional view of the fastened wheel rim in accordance with FIG. 1 with an insert, FIG. 3 a detailed sectional view of the fastened wheel rim in accordance with FIG. 1 with an alternative clamping plate, FIG. 4 a detailed sectional view of a wheel rim fastened to a wheel hub by means of a central fastening in accordance with a second embodiment, FIG. 5 a detailed sectional view of a wheel rim fastened to a wheel hub by means of a bolt circle fastening in accordance with a third embodiment.

FIG. 1 depicts a wheel rim 1 according to the invention with a rim base 2 and a wheel disk 3 made from carbon fiber-reinforced plastic in a partial section that extends as far as an axle 4. For the sake of simplicity, a full cross-sectional representation of the wheel rim 1 has been dispensed with. In the assembled state, the wheel rim 1 is in contact with a schematically represented wheel hub 5 of a vehicle. The wheel hub connection of wheel rim 1 is designed as a central screw connection which uses a wheel nut 6 with screw thread and a ring-shaped clamping plate 7 as a fastener.

Wheel disk 3 has a centric opening 8, in which, in the assembled state, the wheel hub 5 sits. The centric opening 8 has a conical centring surface 9, which is inclined towards the axle 4 and extends across the whole wall cross-section of the wheel disk 3.

The carbon fiber-reinforced plastic used for the wheel rim 1 contains fiber layers 10 processed right across their area, into which endless reinforcing fibers have been incorporated. The fiber layers are arranged so as to extend radially in the wheel disk 3 and parallel to disk contour 11 of wheel disk 3, as can be seen from the flow lines of fiber layers 10 in the wall cross-section of wheel disk 3 depicted. The flow lines indicate, schematically, the cut edges of the individual fiber layers 10. The fiber layers 10 are broken through at the centric opening 8. In a border area 12 around the centric opening 8, the disk contour 11 has a clearly bent form. The fiber layers 10 with the reinforcing fibers follow the redirection of the disk contour 11 from a mostly radial alignment in the outer area of wheel disk 3 into a direction inclined towards the axle in the border area 12 of the centric opening 8. On the centring surface 9 of the wheel disk 3 the fiber layers 10 end in an arrangement perpendicular to this. All the ends of the reinforcing fibers of the fiber layers 10, which are broken through in the opening 8, lie in parallel planes at right angles to centring surface 9.

Contacting flush with this centring surface 9, in the assembled state, is the ring-shaped clamping plate 7 with its corresponding conical seat surface 13. The preload force applied through the wheel nut 6 and the clamping plate 7 in the direction of the axle 4 is introduced via the centring surface 9 in the fiber direction and thereby in the preferred direction in terms of maximum mechanical resilience of the fiber layers 10 into the wheel disk 3.

The seat surface 13 of clamping plate 7 covers the centring surface 9 and slightly overhangs it. It is thereby ensured even where dimensional tolerances occur that the seat surface 13 always completely covers centring surface 9 of wheel disk 3 and the preload force is introduced evenly over the whole centring surface 9 and into each of the fiber layers 10.

In the area of the bent disk contour 11, the wheel disk 3 has, on the inner side, a surface that is convex all the way round, which serves, during the mounting of the wheel rim 1 and bracing of the wheel disk 3, as a bearing surface 14 on the vehicle side, to contact with a corresponding support surface 15, that is concave all the way round, of the wheel hub 5. Thereby short force flow paths of the axially introduced preload force are achieved.

Figure 2:
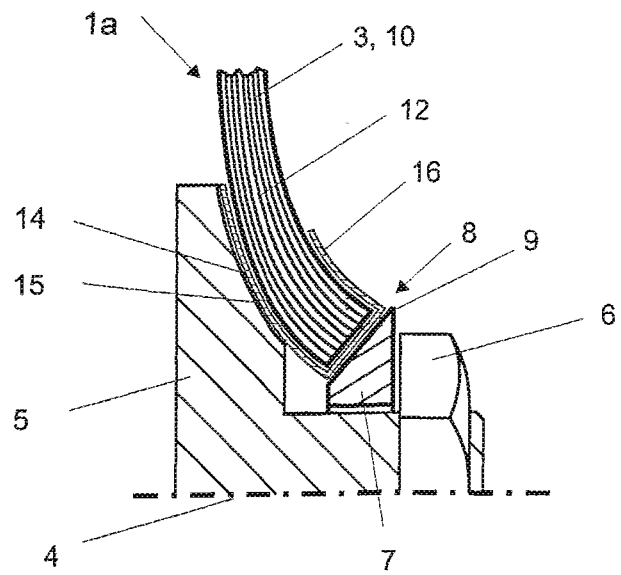

FIG. 2 shows an enlarged detailed view of a wheel rim 1a fastened to the same wheel hub 5 in accordance with FIG.

1. Unlike wheel rim 1 in accordance with FIG. 1, the centric opening 8 of wheel disk 3 is equipped with a metallic insert 16. The insert 16 forms a border to opening 8 all the way round and extends on the outer side of wheel disk 3, on the centring surface 9 and on the inside of the wheel disk 3, where it covers the bearing surface 14 on the vehicle side. The insert 16 protects the opening 8 from mechanical stress during repeated assembly and dismantling, distributes the preload force to be introduced and reduces the rubbing wear between the clamping plate 7 and the wheel disk 3 as well as between the wheel hub 5 and the wheel disk 3.

Figure 3:
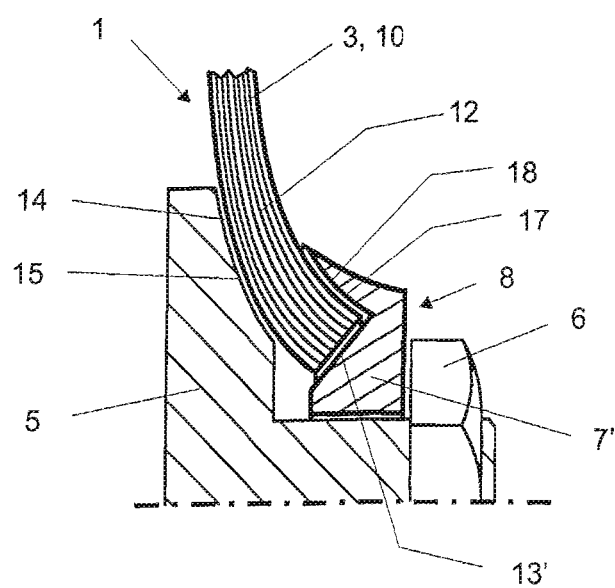

In FIG. 3 the wheel rim 1 fastened to the wheel hub 5 in accordance with FIG. 1 is depicted in a further detailed view. Unlike the wheel rim 1 in accordance with FIG. 1, the wheel disk is fastened with an alternative clamping plate 7' to the wheel hub 5. The clamping plate 7' has, in addition to the seat surface 13' a flange with a support surface 17 that is convex all the way round. The latter is constructed in such a way that is corresponds, during assembly, to an outside bearing surface 18 of wheel disk 3 which extends on the outer surface, concave all the way round, of the border area 12 of opening 8. The support surface 17 can, in an alternative design of the flange which is not depicted, also extend fully over the outer surface of border area 12. When the wheel disk 3 is fastened to the wheel hub 5 using clamping plate 7', a three-sided retainer is formed for the border area 12 of the wheel disk 3 through the support surface 15 of wheel hub 5, seat surface 13' and support surface 17 of clamping plate 7, which means that distortion of the structure of wheel disk 3 is prevented. Thereby an isostatic state of stress is generated, which increases the stability of the wheel disk 3 in the connection zone.

Figure 4:
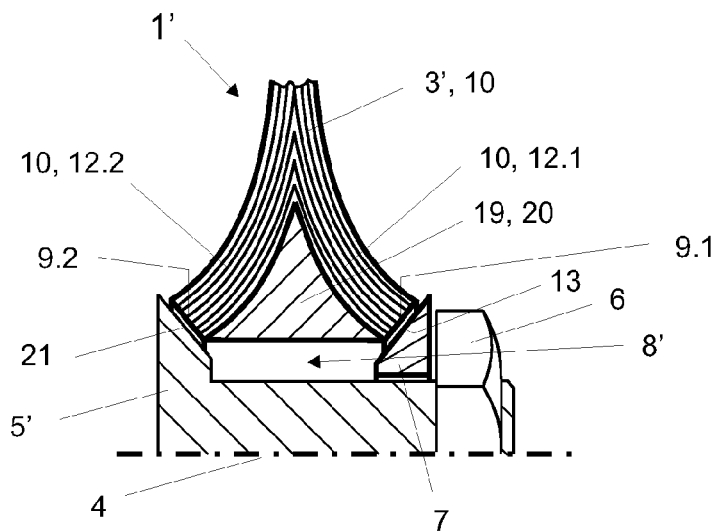

FIG. 4 shows a section of a wheel rim 1' in accordance with the invention and its fastening to a wheel hub 5' using a central fastener in accordance with a second embodiment. Below, only the differences from the embodiment in accordance with FIG. 1 shall be described. The elements that are different are visible in the detailed representation in accordance with FIG. 4, which is why a full sectional representation of wheel rim 1' has been dispensed with. Regarding the repeated elements and components common to both, please refer to the description given for the embodiment in accordance with FIG. 1.

The wheel disk 3' in accordance with FIG. 4 has, at its centric opening 8', a second border area 12.2 with a second conical centring surface 9.2. The wheel disk 3' straddles the opening 8' in two border areas 12.1, 12.2. The two centring surfaces 9.1, 9.2 of wheel disk 3' are arranged opposite each other and as mirror images. The fiber layers 10 of the wheel disk divide in the border areas 12.1, and 12.2 and end, in turn, so as to be perpendicular to the particular centring surface 9.1, 9.2.

In an embodiment variation that is not depicted, the two border areas 12.1, 12.2 are generated through splitting of the total number of fiber layers 10, with the total wall cross-section of the wheel disk 3' divided proportionally over the wall cross-sections of the border areas 12.1, 12.2. The number of fiber layers 10 remains the same in the transition from border area 12.1, 12.2 to the outer circumference of the wheel disk 3'.

In the embodiment depicted in FIG. 4, the design is varied to the effect that in the border areas 12.1, 12.2, additional fiber layers 10 are provided which extend from the edge of border areas 12.1, 12.2 to the centring surfaces 9.1, 9.2. The additional fiber layers 10 widen the wall cross-sections of the border areas 12.1, 12.2 and enlarge the centring areas 9.1, 9.2. This brings about additional distribution of the load in the centric surfaces 9.1, 9.2 and a specifically higher stability of the wheel disk 3 in the border areas 12.1, 12.2.

Between the border areas 12.1, 12.2 an interspace 19 is formed in which a metallic support ring 20 with a wedge-shaped profile is seated in a form-fit manner. This support ring 20 increases the stability of wheel disk 3 in the highly stressed area of the central fastening of wheel rim 1' with the wheel hub 5'.

Corresponding to the second centring surface 9.2, the wheel hub 5' has a seat surface 21 which is conical all the way round. In making the wheel screw connection, the seat surface 13 of clamping plate 7 is pressed against the first centring surface 9.1, whilst the second centring surface 9.2 contacts with the conical seat surface 21 acting in the opposite direction of the wheel hub 5'. As a result, the axial tightening force of wheel nut 6 can be transferred evenly, and in the preferred direction in terms of resilience, onto all fiber layers 10.

Figure 5:
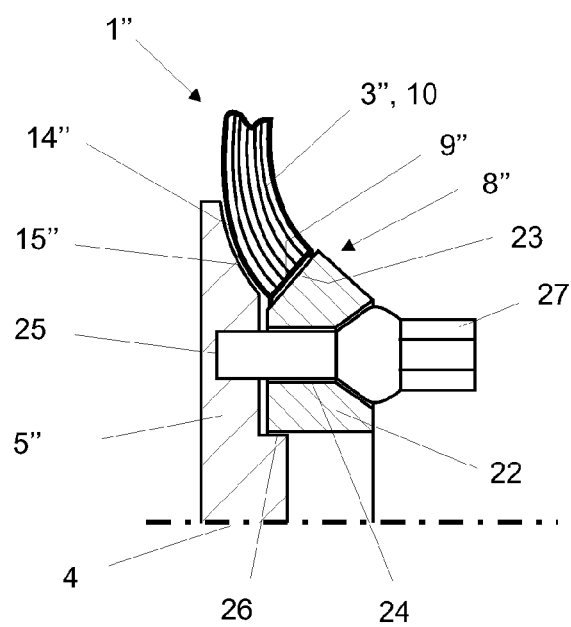

FIG. 5 shows a section of a wheel rim 1" according to the invention and its wheel hub fastening in accordance with a third embodiment. The connection of wheel rim 1" is achieved here by means of a screw connection to a wheel hub 5" with a bolt circle.

The following description is restricted to the explanation of the differences vis-à-vis the embodiment in accordance with FIG. 1 which are visible in the detailed view according to FIG. 5. Regarding the repeated elements and components common to both, please refer to the description given for the embodiment in accordance with FIG. 1.

The wheel rim 1" in accordance with FIG. 5 has, in the same way as the wheel rim 1 in accordance with FIG. 1, a wheel disk 3" made from carbon-fiber-reinforced plastic with a centric opening 8" for accommodating the schematically represented wheel hub 5". By way of a fastener, instead of the ring-shaped clamping plate 7, an adapter disk 22 is provided. On the adapter disk 22, a conical seat surface 23 is formed for the precise fit on the conical centring surface 9" of the centric opening 8". The fiber layers 10 of wheel disk 3" run in a perpendicular direction onto the centring surface 9". Over the circumference of the adapter disk 22 a bolt circle is formed with several, for example 4, apertures 24 in a concentric arrangement. Wheel hub 5" has the same type of bolt circle with the same number and arrangement of threaded holes 25. Wheel hub 5" also has a centring collar 26 for precise application of the adapter disk 22.

In order to mount the wheel rim 1" on the wheel hub 5", the wheel disk 3" is aligned on the centric collar 26 using the adapter disk 22. With conventional wheel bolts 27, which are passed through the openings 24 of the adapter disk 22 into the threaded holes 25, the wheel rim 1" is screwed onto the wheel hub 5" until the bearing surface 14" of the wheel disk 3" contacts with the concave support surface 15" of the wheel hub 5". Here too, the axial preload force of the wheel bolts 27 is introduced by means of a short force flow path and chiefly in the fiber direction into the fiber layers 10.

With the aid of the adapter disk 22 a wheel rim 1, 1', 1" according to the invention with a centric opening 8, 8', 8" can alternatively also be mounted onto a wheel hub 5" with a bolt circle screw connection.

LIST OF REFERENCE DRAWINGS

1 Wheel rim
2 Rim base
3 Wheel disk
4 Axle
5 Wheel hub

6 Fastener, Wheel nut
7 Fastener, Clamping plate
8 Centric opening of the wheel disk
9 Conical centring surface, first 9.1, second 9.2
10 Fiber layer
11 Disk contour
12 Border area of the opening, first 12.1, second 12.2
13 Seat surface of the clamping plate
14 Bearing surface of the wheel disk, vehicle side
15 Concave support surface of the wheel hub
16 Insert
17 Convex support surface of the clamping plate
18 Bearing surface of the wheel disk, outside
19 Interspace
20 Support element, Support ring
21 Conical seat surface of the wheel hub
22 Fastener, Adapter disk
23 Seat surface of the adapter disk
24 Opening, aperture of the adapter disk
25 Threaded hole of the wheel rim
26 Centring collar
27 Fastening bolts, Wheel bolts

What is claimed is:

1. A wheel rim, wherein the wheel rim comprises a wheel disk of fiber composite material and at least one fastener to fasten the wheel disk at a wheel hub of a vehicle, the wheel disk having an opening to accommodate the wheel hub, which opening is formed with a conical centring surface for a corresponding seat of the at least one fastener, and wherein reinforcing fibers of the fiber composite material are arranged in sheet-like fiber layers and at least one part of the fiber layers is arranged in a first border area of the opening perpendicular to the centring surface of the wheel disk.

2. The wheel rim of claim 1, wherein the conical centring surface is formed completely stretched through a wall cross-section of the wheel disk.

3. The wheel rim of claim 1, wherein the fiber layers of fiber composite material are arranged substantially parallel to a wheel contour of the wheel disk.

4. The wheel rim of claim 1, wherein the at least one fastener has a seat bottom which is formed congruently to the centring surface of the wheel disk.

5. The wheel rim of claim 1, wherein the first border area of the opening comprises a metallic insert.

6. The wheel rim of claim 5, wherein the metallic insert is arranged to surround the first border area of the opening.

7. The wheel rim of claim 1, wherein the wheel disk on a vehicle side has a bearing surface to bear the wheel hub on a support surface, the support surface being interlockingly formed corresponding to the bearing surface.

8. The wheel rim of claim 7, wherein a metallic insert in the border area of the opening is arranged stretched beyond the bearing surface.

9. The wheel rim of claim 1, wherein the wheel disk has on an outside a bearing surface and the at least one fastener has a support surface which formfittingly corresponds with the outside bearing surface.

10. The wheel rim of claim 9, wherein a metallic insert in the border area of the opening is arranged stretched beyond the bearing surface.

11. The wheel rim of claim 1, wherein a second border area with a second conical centring surface is formed at the opening, a part of the fiber layers of the wheel disk fiber composite material being arranged on the second border area and perpendicular to the second centring surface.

12. The wheel rim of claim 11, wherein the second conical centring surface is formed for a corresponding seat of the wheel hub.

13. The wheel rim of claim 11, wherein a support element is arranged in an interspace formed between the first and second border areas.

14. The wheel rim of claim 1, wherein the at least one fastener is formed as an adapter disk which comprises a seat bottom for the seat on the centring surface of the opening of the wheel disk and several concentrically arranged openings for bearing fastening bolts.

15. The wheel rim of claim 14, wherein the adapter disk is formed in such a way that it can be arranged on a centring collar of the wheel hub.

* * * * *